US012103149B2

(12) United States Patent
Preciado Hernandez et al.

(10) Patent No.: US 12,103,149 B2
(45) Date of Patent: Oct. 1, 2024

(54) CLIP INSTALLATION TOOLS

(71) Applicant: Toyota Motor Engineering & Manufacturing North America, Inc., Plano, TX (US)

(72) Inventors: Samantha Pamela Preciado Hernandez, Rosarito (MX); Perla Del Rosario Lopez Castro, Tijuana (MX); Arnaldo Josue Miranda Lopez, Tecate (MX); José Luis Torres, Tecate (MX)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 172 days.

(21) Appl. No.: 17/856,012

(22) Filed: Jul. 1, 2022

(65) Prior Publication Data

US 2024/0001521 A1 Jan. 4, 2024

(51) Int. Cl.
*B25B 27/00* (2006.01)
*B25B 27/20* (2006.01)

(52) U.S. Cl.
CPC .................................... *B25B 27/20* (2013.01)

(58) Field of Classification Search
CPC ... B25B 27/20; B25B 27/0007; B25B 27/146; B25B 27/26
See application file for complete search history.

(56) References Cited

U.S. PATENT DOCUMENTS 5,607,436 A 3/1997 Pratt et al.
5,720,756 A 2/1998 Green et al.
8,845,684 B2 * 9/2014 von Oepen ........ A61B 17/0057 606/213
10,792,084 B2 * 10/2020 Milor ................. A61B 17/7091
2012/0144649 A1 6/2012 Ganesan et al.
2017/0129019 A1 5/2017 Greif et al.
2018/0250453 A1 9/2018 Hu et al.
2018/0361559 A1 * 12/2018 Bantle .................. B25D 11/102
2018/0368902 A1 * 12/2018 Milor .................... B25B 15/005
2019/0126446 A1 5/2019 Irwin et al.
2020/0289748 A1 9/2020 Lanigan et al.
2021/0038226 A1 2/2021 Bales et al.
2022/0125489 A1 * 4/2022 Lefauconnier ...... B25B 23/1415
2022/0234862 A1 * 7/2022 Hurley ...................... A61F 5/32
2024/0001521 A1 * 1/2024 Preciado Hernandez .................. B25B 27/20

FOREIGN PATENT DOCUMENTS

KR 1020170012653 A 2/2017
WO 2010077228 A1 7/2010

OTHER PUBLICATIONS

Mod-eez® Drilling Jig, (https://knappconnectors.com/product/mod-eez%EF%B8%8F-drilling-jig/).

* cited by examiner

*Primary Examiner* — Lee D Wilson
(74) *Attorney, Agent, or Firm* — Dinsmore & Shohl LLP

(57) ABSTRACT

A clip installation tool that includes a shaft defining a first bore centered around a central axis. The first bore receives a spring therein. The clip installation tool further includes a movable portion partially disposed within the first bore and in contact with the spring. The movable portion defines a second bore. The clip installation tool further includes a stopper extending at least partially within the second bore and a handle coupled to the shaft.

9 Claims, 3 Drawing Sheets

CLIP INSTALLATION TOOLS

TECHNICAL FIELD

The present specification generally relates to vehicle manufacture, and, more specifically, to tools for facilitating manufacture.

BACKGROUND

During installation of vehicle components, it may be necessary to ensure that certain components are appropriately installed so that they function properly under normal use conditions.

SUMMARY

In one aspect, a clip installation tool includes a shaft defining a first bore centered around a central axis. The first bore receives a spring therein. The clip installation tool further includes a movable portion partially disposed within the first bore and in contact with the spring. The movable portion defines a second bore. The clip installation tool further includes a stopper extending at least partially within the second bore and a handle coupled to the shaft.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
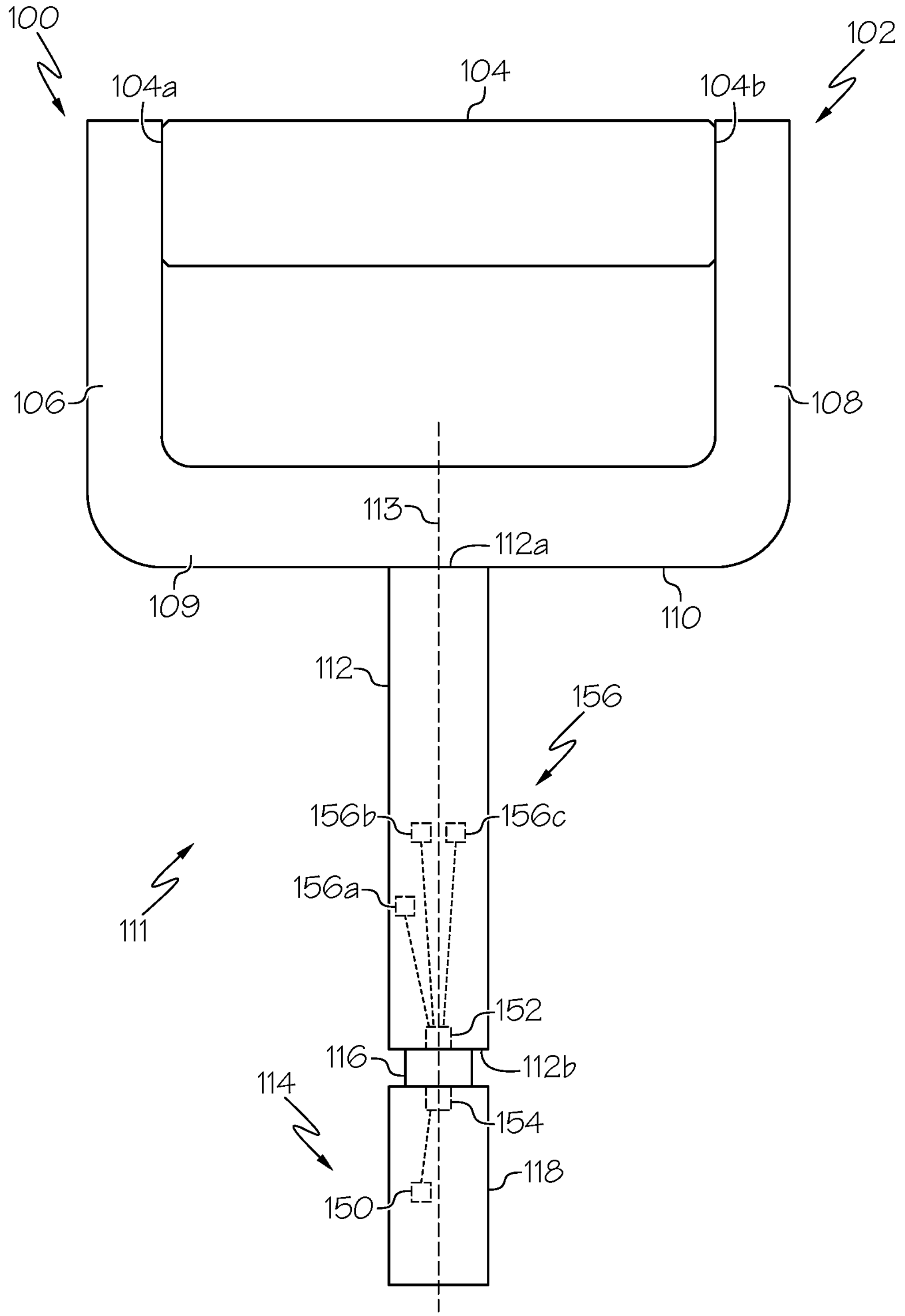
FIG. 1 depicts a side view of an illustrative clip installation tool according to one or more embodiments shown or described herein.

The present disclosure generally relates to a clip installation tool that allows for an installer to install a clip in a manner that is consistent and prevents or reduces an excessive force being applied to the clip. In addition, the clip installation tool is designed to be ergonomic and avoids requiring an installer to reach into a difficult-to-reach space to ensure proper clip installation. The clip installation tool described herein includes a handle, a shaft extending from the handle, and a spring mechanism partially disposed within a bore of the shaft. The shaft and spring mechanism are each particularly shaped and configured so that only a particular amount of force is applied to the clip during an install process, and so that the clip can only travel a particular distance, so as to avoid excessive force being applied to the clip and/or avoid over travel of the clip during the installation process. In some embodiments, the clip installation tool described herein may also incorporate a feedback element that allows a user to receive feedback from the tool once the clip has been appropriately installed. For example, the tool described herein may include a visual indicator, a tactile indicator, a light indicator, and/or an audio indicator that allows a user thereof to feel and/or visually determine whether or not the clip has been appropriately installed from the indicators, particularly in embodiments where the clip may be obscured from view.

Certain clips that are installed by manufacturing employees may be difficult (e.g., ergonomically difficult) to install during a manufacturing operation. For example, it may be difficult to install a clip by hand because the installation location is difficult to reach (e.g., located in an area that is difficult to reach by hand). In addition, certain clips may necessitate a particular amount of driving force and/or a particular driving distance to ensure appropriate installation, which may be difficult to complete by hand without a tool. Certain clip installation tools may use complex electronic or electromechanical devices that are expensive, prone to breakdown, heavy, and difficult to implement. Other clip installation tools may be more adapted for particular use in the medical/surgical space, but are not suitable for use in the manufacturing space because of the specific manufacturing requirements (e.g., dimensional requirements, material requirements, sterilization requirements) needed to form such tools, which are cost prohibitive and unnecessary for manufacturing, such as vehicle manufacture. Such installation tools may also not include other means of providing feedback to a user to indicate that a clip has been installed.

The term "clip" as used herein generally relates to a device that joins a plurality of components together. The present disclosure is not meant to be limited to any particular shape or size of clip, as the tools described herein can be shaped and sized to correspond to any shape or size of clips. Other devices generally recognized as being a functional alternative of a clip are also included within the scope of the present disclosure, as the tools described herein can be adapted for the purposes of installing such devices, which include, but are not limited to, pins, fasteners, clasps, buckles, pivots, hinges, or the like.

Figure 2:
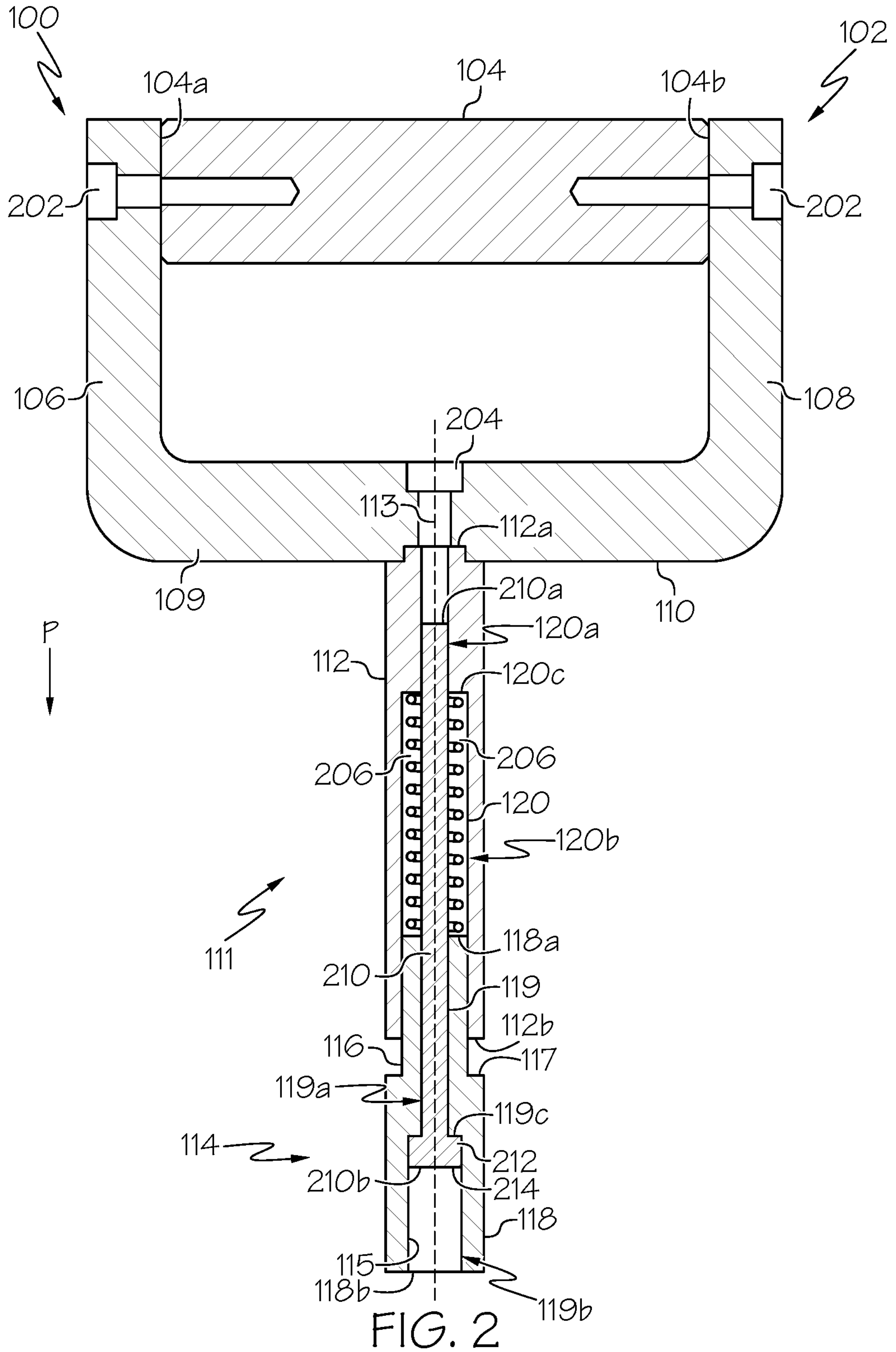
FIG. 2 depicts a sectional side view of the clip installation tool of FIG. 1 in a first position according to one or more embodiment shown or described herein.
Figure 3:
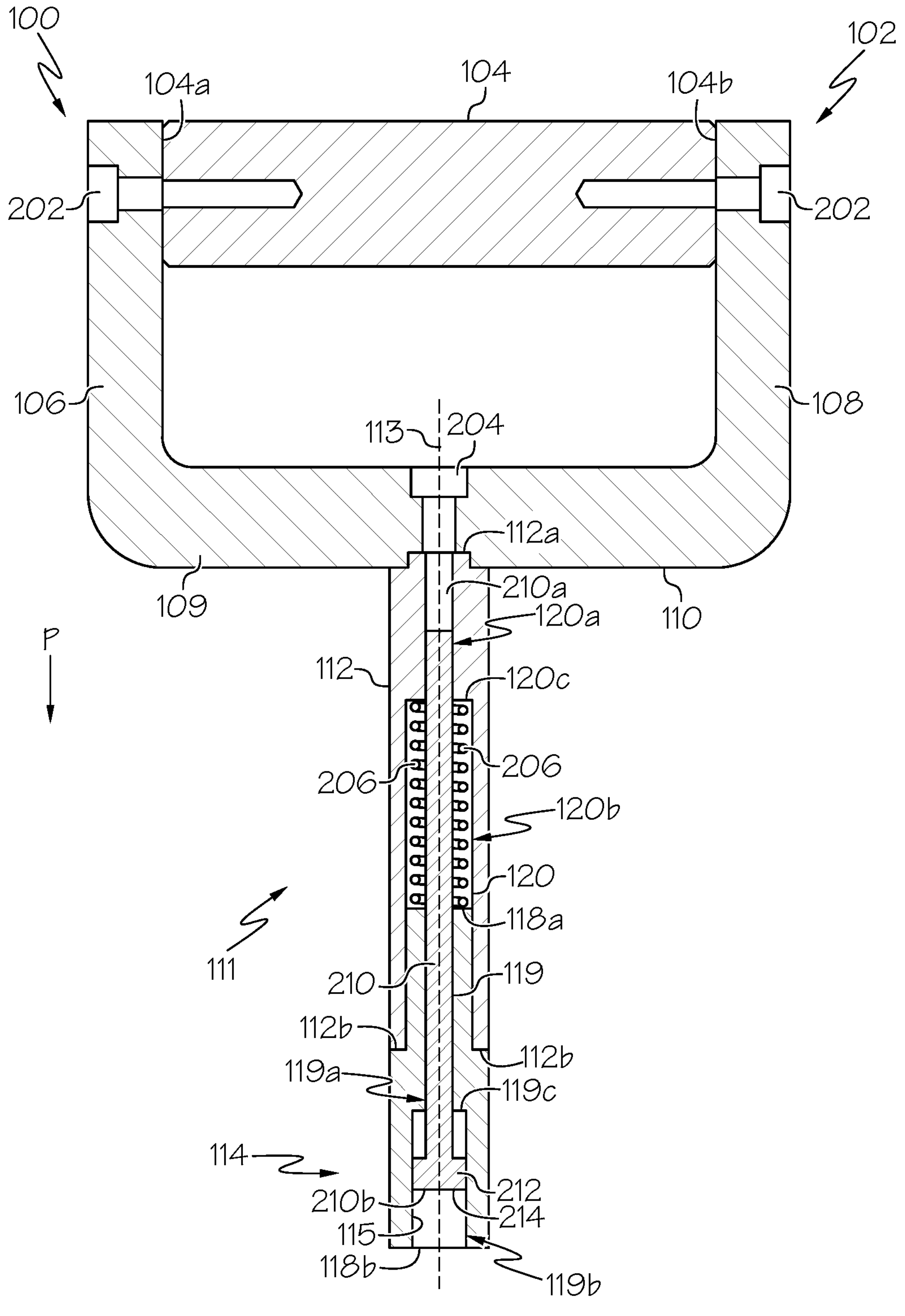
FIG. 3 depicts a sectional side view of the clip installation tool of FIG. 1 in a second position according to one or more embodiments shown or described herein.

Referring to FIGS. 1-3, an illustrative clip installation tool 100 is depicted. The clip installation tool 100 generally includes a handle 102 coupled to a shaft 111.

The handle 102 generally includes a body 110 having a gripping portion 104 that shaped, sized, and contoured to be held by a user. Various features (e.g., surface features, dimensions, materials, etc.) of the gripping portion 104 that provide an area for holding by a user (e.g., finger grooves) should generally be understood and are not described in further detail herein. In some embodiments, the gripping portion 104 may be supported by a first support post 106 and a second support post 108 that extend from a base portion 109 of the body 110. For example, the gripping portion 104 may have a first end **104*a* coupled to the first support post 106 and a second end 104*b* coupled to the second support post 108. In some embodiments, as particularly shown in FIGS. 2 and 3, the gripping portion 104 may be coupled via pins 202 or the like to the first support post 106 and the second support post 108. For example, a first pin 202 may couple the first support post 106 to the first end 104*a* of the gripping portion 104 and a second pin 202 may couple the second support post 108 to the second end 104*b* of the gripping portion 104. The use of such pins may allow the gripping portion 104 to rotate between the first support post 106 and the second support post 108**, thereby providing additional ergonomic capabilities.

Still referring to FIGS. 1-3, the shaft 111 includes a body 112 having a first end 112*a* coupled to the handle 102 (e.g., to the base portion 109 of the body 110 of the handle 102) and a second end 112*b* spaced a distance from the first end 112*a*. The distance spanning the first end 112*a* and the second end 112*b* of the body 112 the shaft 111 may correspond to a particular reach necessary to place a clip. That is, the distance spanning the first end 112*a* and the second end 112*b* of the body 112 of the shaft 111 generally corresponds to a length of an area between where a user can reach and a location where the clip is to be installed. In some embodiments, as particularly shown in FIGS. 2 and 3, shaft 111 may be coupled via a pin 204 or the like to the handle 102. In some embodiments, the use of such a pin may allow the handle 102 to rotate relative to the shaft 111, thereby providing additional ergonomic capabilities.

As particularly depicted in FIGS. 2 and 3, the body 112 of the shaft 111 defines a first bore 120 therethrough. The first bore 120 generally extends a distance between the first end 112*a* and the second end 112*b* of the body 112 of the shaft 111. In some embodiments, the distance may be the entire distance between the first end 112*a* and the second end 112*b*, and in other embodiments, the distance may be less than the entire distance between the first end 112*a* and the second end 112*b*. The first bore 120 is generally centered around a central axis 113 of the shaft 111, the central axis 113 being, for example, an axis passing through the first end 112*a* and the second end 112*b*. In some embodiments, the first bore 120 may have the same diameter throughout an entire length thereof. In other embodiments, such as the embodiment depicted in FIGS. 2 and 3, the first bore 120 may have a first section 120*a* having a first diameter and a second section 120*b* having a second diameter. A shoulder 120*c* may be formed at the intersection of the first section 120*a* and the second section 120*b*. In still other embodiments, the first bore 120 may have a diameter that is tapered or otherwise variable.

The first bore 120 receives a biasing assembly 206 therein, such as a spring or the like. The biasing assembly 206 may be disposed within the first bore 120 and contacting the shoulder 120*c* within the first bore 120, as shown in FIGS. 2 and 3. The biasing assembly 206 may be particularly tuned or wound such that a particular amount of force applied by a user in a direction P as depicted in FIG. 2 is needed to compress the biasing assembly 206. Such a particular tuning may be completed to ensure excessive force is not applied by the user. For example, the biasing assembly 206 may be wound so that a maximum amount of 7 kilograms (kg) of weight is applied to a clip during an installation process. Other specific weights greater or less than 7 kg are also contemplated and included within the scope of the present disclosure.

Also disposed within the first bore 120 is a movable portion 114. The movable portion 114 may extend a distance out of the first bore 120 (e.g., extend out of an opening in the second end 112*b* of the body 112 of the shaft 111) such that the movable portion 114 is partially disposed within the first bore 120. The movable portion 114 may contact the biasing assembly 206 within the first bore 120. That is, the biasing assembly 206 may be disposed in the first bore 120 between the shoulder 120*c* and the movable portion 114 such that movement of the movable portion 114 toward the first end 112*a* of the body 112 of the shaft 111 compresses the biasing assembly 206 between the shoulder 120*c* and the movable portion 114. For example, the biasing assembly 206 is shown in an uncompressed state in FIG. 2 when the clip installation tool 100 is in a first position (e.g., a loading position) and in a compressed state in FIG. 3, being compressed between the movable portion 114 and the shoulder 120*c* when the clip installation tool 100 is in a second position (e.g., an installing position).

The movable portion 114 is generally elongate, having a first end 118*a* and a second end 118*b*. The first end 118*a* is generally disposed within the first bore 120 and contacts the biasing assembly 206. The second end 118*b* is generally disposed at a location outside the first bore 120. As depicted in FIGS. 1-3, the movable portion 114 includes a first section 116 and a second section 118. The first section 116 of the movable portion 114 is generally disposed adjacent to the first end 118*a* of the movable portion 114 and the second section 118 is generally disposed adjacent to the second end 118*b* of the movable portion 114. The first section 116 has a first diameter that is generally smaller than a diameter of the second section 118 (e.g., the second section 118 has a larger diameter than the first section 116). The diameter of the first section 116 corresponds to the diameter of the second section 120*b* of the first bore 120 such that the first section 116 of the movable portion 114 can be received within the first bore 120 as described herein. In addition, the larger diameter of the second section 118 relative to the first section 116 is such that the second section cannot move within the first bore 120. An intersection between the first section 116 and the second section 118 may define a shoulder 117. The shoulder 117 may abut the second end 112*b* of the body 112 when the clip installation tool 100 is in the second position (e.g., the installing position) as shown in FIG. 3 and may be spaced apart from the second end 112*b* of the body 112 when the clip installation tool 100 is in the first position (e.g., the loading position) as shown in FIGS. 1 and 2. When in the first position as shown in FIGS. 1 and 2, a portion of the first section 116 is exposed between the shoulder 117 and the second end 112*b* of the body 112. In some embodiments, this exposed area may have a particular color, thereby providing a visual indicator when the clip installation tool 100 is in the first or loading position. That is, the particular color is not visible when the clip installation tool 100 is in the second or installing position because the area is disposed within the first bore 120. In some embodiments, the various components described herein may be shaped and sized such that the exposed portion is about 10 millimeters (mm) in length between the shoulder 117 and the second end 112*b* of the body 112 when the clip installation tool 100 is in the first position. Other lengths greater or less than 10 millimeters are contemplated and included within the scope of the present disclosure.

Still referring to FIGS. 2 and 3, the movable portion 114 further defines a second bore 119 therethrough. The second bore 119 generally extends a distance between the first end 118*a* and the second end 118*b* of the movable portion 114. The second bore 119 is generally centered around the central axis 113 of the shaft 111. The second bore 119 includes a first section 119*a* having a first diameter and a second section 119*b* having a second diameter. A shoulder 119*c* may be formed at the intersection of the first section 119*a* and the second section 119*b*. The second bore 119 may further be defined by an inner wall 115 of the movable portion 114.

Also depicted in FIGS. 2 and 3 is a stopper 210 that is received within the first bore 120 and the second bore 119. That is, the stopper 210 extends through a length of the shaft 111 in the first bore 120 and through the second bore 119 of the movable portion 114 such that the movable portion 114 is movable along a length of the stopper 210. The stopper 210 is elongate such that the stopper 210 has a first end 210*a* spaced apart from a second end 210*b* thereof. The first end

210*a* of the stopper 210 is generally disposed within the first section 120*a* of the first bore 120. The second end 210*b* of the stopper 210 is generally disposed within the second section 119*b* of the second bore 119. The stopper 210 may generally have a diameter that corresponds to the respective diameters of the first section 120*a* of the first bore and the first section 119*a* of the second bore such that the stopper 210 can be received in both bores. In addition, the second end 210*b* of the stopper 210 may have a head 212 that is shaped and sized to correspond to the diameter of the second section 119*b* of the second bore 119. That is, the head 212 may have a larger diameter relative to a diameter of the remainder of the stopper 210 (e.g., a flared head or the like). The head 212 may include a contact surface 214 for contacting a clip and may transfer a force to the clip when the clip installation tool 100 is in use. The head 212 may further be shaped and sized such that the contact surface 214 of the head 212 receives a clip and, together with inner wall 115, maintains a positioning of the clip so that the clip is centered upon the central axis 113 during an installation process (e.g., during translation between the first and second positons).

It should be appreciated that the stopper 210 generally remains stationary relative to the body 112 of the shaft 111 and the handle 102 when the clip installation tool 100 is translated between the first, loading position depicted in FIG. 2 and the second, installing position depicted in FIG. 3. That is, the movable portion 114 is slidable along at least a portion of the length of the stopper 210.

In some embodiments, additional electronic components may be incorporated in or on the clip installation tool. For example, as shown in FIG. 1, the clip installation tool may further include a first electrical contact 152 disposed on or integrated with the shaft 111 and a second electrical contact 154 disposed on or integrated with the movable portion 114. One of the electrical contacts 152, 154 may be electrically coupled to a power source 150 such as a battery (FIG. 1 depicts the second electrical contact 154 as being electrically coupled to the power source 150). The other one of the electrical contacts 152, 154 may be electrically coupled to one or more indicator elements 156. Such indicator elements 156 include, but are not limited to, a haptic element 156*a* such as a motor or the like, a light emitting element 156*b* such as a light emitting diode or the like, and/or an audio emitting element such as a speaker or the like. Physical contact between the electrical contacts 152, 154 causes electrical power from the power source to be delivered to the indicator elements, thereby causing the indicator elements to actuate. As a result, when the second end 112*b* contacts the movable portion 114, a haptic element 156*a* actuates to provide a haptic alert in response, the light emitting element 156*b* illuminates in response, and/or the audio emitting element actuates to emit an audio alert in response.

In operation, the clip installation tool 100 begins in the first, loading position depicted in FIG. 2. As previously described and shown in FIG. 2, the biasing assembly 206 is uncompressed. A clip is placed in contact with the contact surface 214 of the head 212 of the stopper 210 by placing at least a portion of the clip within the second bore 119. The clip installation tool 100 is then placed relative to the location where the clip is to be installed, and a user then applies a force in direction P (as shown in FIG. 2) to press the clip into the desired area. In this position, the exposed area of the second section 118 provides a visual indicator of the first, loading position. As the force is applied, the clip installation tool 100 translates to the second, installing position. The biasing assembly 206 compresses as shown in FIG. 3, providing a biasing force onto the movable portion 114 and ensuring excessive force by the user is not applied to the clip. Further, the movable portion 114 is prevented from further movement along the central axis 113 due to contact between the shoulder 117 and the second end 112*b* of the body 112 of the shaft 111, thereby covering the previously exposed area of the second section 116 so the visual indicator is no longer visible. In embodiments where the electrical contacts 152, 154 and indicator elements 156 are present, movement into the second, installing position causes contact between the electrical contacts 152, 154, thereby actuating the one or more indicator elements 156 to provide a haptic alert, a light emitting alert, and/or an audio alert.

Based on the foregoing, it should now be understood that the clip installation tool described herein allows for an installer to install a clip in a manner that is consistent and prevents or reduces an excessive force being applied to the clip. In addition, the clip installation tool is designed to be ergonomic and provides for easier reachability. The components of the clip installation tool allow only a particular amount of force to be applied to the clip during an install process, and so that the clip can only travel a particular distance and excessive force is avoided. Additional feedback can be delivered to the user in the form of a visual indicator, a tactile indicator, a light indicator, and/or an audio indicator that allows a user thereof to feel and/or visually determine whether or not the clip has been appropriately installed from the indicators, particularly in embodiments where the clip may be obscured from view.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A clip installation tool, comprising:

a shaft defining a first bore centered around a central axis, the first bore receiving a spring therein;

a movable portion partially disposed within the first bore and in contact with the spring, the movable portion defining a second bore;

a fixed stopper extending at least partially within the second bore, wherein the movable portion is movable with respect to the fixed stopper; and a handle coupled to the shaft.

2. The clip installation tool of claim 1, wherein the shaft comprises:

a first end coupled to the handle; and a second end in contact with the movable portion in an installing position.

3. The clip installation tool of claim 2, further comprising a haptic element that provides a haptic alert in response to the second end contacting the movable portion in the installing position.

4. The clip installation tool of claim 2, further comprising a light emitting element that illuminates in response to the second end contacting the movable portion in the installing position.

5. The clip installation tool of claim 2, further comprising an audio emitting element that emits an audio alert in response to the second end contacting the movable portion in the installing position.

6. The clip installation tool of claim 1, wherein the second bore is sized to receive a clip and is centered upon the central axis.

7. The clip installation tool of claim 1, wherein the fixed stopper extends at least partially within the first bore.

8. The clip installation tool of claim 1, wherein the movable portion comprises:

a first section defining a first diameter, the first section at least partially disposed within the first bore; and a second section defining a second diameter greater than the first diameter, the second section defining the second bore.

9. The clip installation tool of claim 1, wherein in an installing position of the clip installation tool, the spring applies a biasing force onto the movable portion.

* * * * *